(12) United States Patent
Hattori et al.

(10) Patent No.: US 7,367,192 B2
(45) Date of Patent: *May 6, 2008

(54) COMBINED CYCLE PLANT (75) Inventors: Youichi Hattori, Higashiibaraki (JP); Taiji Inui, Hitachi (JP)

(73) Assignees: Hitachi, Ltd., Tokyo (JP); Hitachi Engineering Co., Ltd., Hitachi-Shi (JP)

( * ) Notice: Subject to any disclaimer, the term of this patent is extended or adjusted under 35 U.S.C. 154(b) by 128 days.

This patent is subject to a terminal disclaimer.

(21) Appl. No.: 11/122,012

(22) Filed: May 5, 2005

(65) Prior Publication Data

US 2005/0198939 A1    Sep. 15, 2005

Related U.S. Application Data

(62) Division of application No. 10/636,756, filed on Aug. 8, 2003, now Pat. No. 6,983,585.

(30) Foreign Application Priority Data

Aug. 9, 2002   (JP) ............... 2002-232270

(51) Int. Cl.
*F02C 1/00* (2006.01)
(52) U.S. Cl. ..................... 60/772; 60/39.182
(58) Field of Classification Search .......... 60/772–775, 60/778, 779, 786, 39.3, 39.181–39.183
See application file for complete search history.

(56) References Cited

U.S. PATENT DOCUMENTS

| 4,081,956 A | * | 4/1978 | Baker et al. ............. 60/39.182 |
|---|---|---|---|
| 4,424,668 A | | 1/1984 | Mukherjee |
| 4,519,207 A | * | 5/1985 | Okabe et al. ............ 60/39.182 |
| 4,697,415 A | | 10/1987 | Schiffers |
| 4,720,968 A | | 1/1988 | Knizia |
| 4,723,407 A | | 2/1988 | Goebel et al. |
| 4,998,408 A | | 3/1991 | Wiekmeijer |
| 5,203,160 A | * | 4/1993 | Ozono ........................ 60/778 |
| 5,269,130 A | | 12/1993 | Finckh et al. |
| 5,428,950 A | | 7/1995 | Tomlinson et al. |
| 5,577,377 A | | 11/1996 | Tomlinson |
| 5,628,179 A | | 5/1997 | Tomlinson |
| 5,630,314 A | | 5/1997 | Kojima et al. |
| 5,737,912 A | | 4/1998 | Krakowitzer |
| 5,755,089 A | | 5/1998 | Vanselow |
| 5,784,888 A | * | 7/1998 | Termuehlen ................. 60/677 |
| 6,105,362 A | | 8/2000 | Ohtomo et al. |
| 6,109,020 A | | 8/2000 | Liebig |

(Continued)

FOREIGN PATENT DOCUMENTS

DE    19849740    1/2000

*Primary Examiner*—William H. Rodriguez
(74) *Attorney, Agent, or Firm*—Antonelli, Terry, Stout & Kraus, LLP.

(57) ABSTRACT

In a combined cycle plant that combines a conventional thermal power plant and a gas turbine plant, there is provided a dump system 1 that connects a main steam pipe 60 with the condenser 25 and dumps the steam generated by the boiler 10 into the condenser 25, bypassing the steam turbine; and HRSG HP turbine bypass system 2 and HRSG LP turbine bypass system 3 which connect the HP pipe 70 and LP pipe 71 of the heat recovery steam generator, respectively.

6 Claims, 6 Drawing Sheets

U.S. PATENT DOCUMENTS

| | | |
|---|---|---|
| 6,128,895 A | 10/2000 | Takahama et al. |
| 6,178,734 B1 | 1/2001 | Shibuya et al. |
| 6,212,873 B1 * | 4/2001 | Sugishita et al. ........ 60/39.182 |
| 6,223,523 B1 | 5/2001 | Frutschi |
| 6,256,978 B1 * | 7/2001 | Gericke et al. .......... 60/39.182 |
| 6,301,874 B1 | 10/2001 | Wakazono et al. |
| 6,397,575 B2 | 6/2002 | Tomlinson et al. |
| 6,578,352 B2 | 6/2003 | Morikawa et al. |
| 6,598,399 B2 | 7/2003 | Liebig |
| 6,615,575 B2 | 9/2003 | Liebig |
| 6,644,011 B2 | 11/2003 | Cheng |
| 6,679,047 B1 | 1/2004 | Uematsu et al. |
| 6,782,703 B2 | 8/2004 | Dovali-Solis |
| 6,810,675 B2 | 11/2004 | Liebig |
| 6,829,898 B2 | 12/2004 | Sugishita |
| 6,851,266 B2 | 2/2005 | Liebig |
| 6,912,855 B2 * | 7/2005 | Bescherer et al. ............ 60/772 |
| 6,983,585 B2 * | 1/2006 | Hattori et al. ........... 60/39.182 |

* cited by examiner

COMBINED CYCLE PLANT

CROSS-REFERENCE TO RELATED APPLICATION

This application is a divisional application of U.S. application Ser. No. 10/636,756, filed Aug. 8, 2003 now U.S. Pat. No. 6,983,585 the contents of which are incorporated herein by reference.

BACKGROUND OF THE INVENTION

The present invention relates to a combined cycle plant that combines a conventional thermal power plant and a gas turbine plant.

In a well-known combined cycle plant combining a conventional thermal power plant comprising a boiler, steam turbine, condenser, etc. and a gas turbine plant comprising a gas turbine and heat recovery steam generator, the steam generated by the boiler of the conventional thermal power plant and the steam generated by the heat recovery steam generator of the gas turbine plant are put together to drive the steam turbine.

A prior art relating to this type of power plant is disclosed, for example, in the Japanese Laid-open Patent Publication No. 2000-220412.

SUMMARY OF THE INVENTION

A power plant is equipped with a system for dumping the steam generated by the boiler into the condenser at the time of start, stop and load rejection. Since the prior art mentioned above relates to a power plant that combines a conventional thermal power plant and a gas turbine plant and so the plant is equipped with two steam generators, i.e. boiler and heat recovery steam generator, it is necessary to install two dump systems for dumping the generated steam into the condenser. Consequently, the system layout becomes complicated and multiple inlet ports need to be installed on the condenser.

The present invention provides a means for constructing a dump system for dumping the generated steam into the condenser without increasing the number of inlet ports on the condenser of an existing plant.

A combined cycle plant according to the present invention is equipped with a dump system that connects the boiler pipe with the condenser and dumps the steam generated by the boiler into the condenser, bypassing the steam turbine, and a pipe that connects the heat recovery steam generator pipe with the dump system into the condenser.

DETAILED DESCRIPTION OF THE PREFERRED EMBODIMENTS

Preferred embodiments of the invention are described hereunder, using FIG. 1 to FIG. 6.

Embodiment 1

Figure 1:
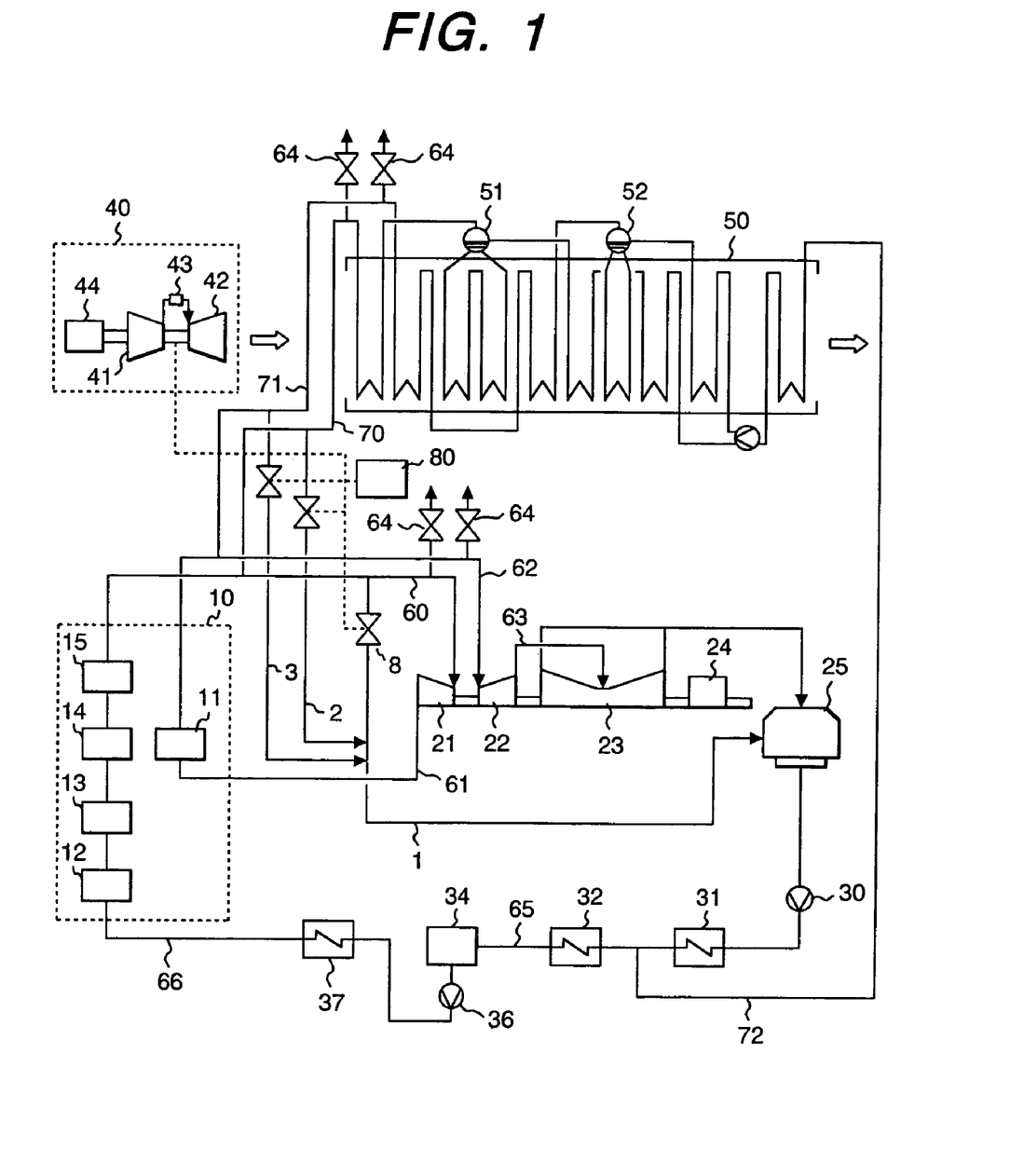
FIG. 1 is a schematic diagram of the combined cycle plant according to the embodiment 1 of the invention.

A preferred embodiment of a combined cycle plant according to the present invention is described hereunder, using FIG. 1.

The power plant is equipped mainly with two plants: a conventional thermal power plant comprising a boiler 10, a boiler pipe including a main steam pipe 60, cold reheat pipe 61 and hot reheat pipe 62, high-pressure (HP), intermediate-pressure (IP) and low-pressure (LP) turbines 21,22 and 23, respectively, a condenser 25, and a condensate water/feedwater system; and a gas turbine plant comprising a gas turbine 40, a heat recovery steam generator 50 that recovers heat from the exhaust of the gas turbine 40, and a heat recovery steam generator pipe including a HP pipe 70 and LP pipe 71.

In FIG. 1, feedwater supplied to the boiler 10 is heated by an economizer 12 and steam is generated by an evaporator 13. The generated steam, while being superheated through a primary superheater 14 and a secondary superheater 15, is directed as superheated steam into the HP turbine 21 through the main steam pipe 60 connecting the evaporator 13 with the HP turbine 21.

On the other hand, the steam generated by the heat recovery steam generator 50 is joined into the main steam pipe 60 through the HP pipe 70 connecting a HP drum 51 with the main steam pipe 60 and also directed as superheated steam into the HP turbine 21.

After having driven the HP turbine 21, the steam flows through the cold reheat pipe 61 and is directed to a reheater 11 of the boiler 10. The steam superheated by the reheater 11 is supplied to the IP turbine 22 through the hot reheat pipe 62. On the other hand, the steam generated by the heat recovery steam generator 50 is joined into the hot reheat pipe 62 through the LP pipe 71 connecting the LP drum 52 with the hot reheat pipe 62 and also directed as superheated steam into the IP turbine 22.

After having driven the IP turbine 22, the steam is led into the LP turbine 23 through a crossover pipe 63. The steam, after having driven the LP turbine 23, is then led into the condenser 25 and turns to condensate water.

The condensate water condensed by the condenser 25 is then pressurized by a condensate pump 30 and heated by a gland steam condenser 31, and then branched into the condensate for the conventional thermal power plant and the feedwater for the heat recovery steam generator 50 of the gas turbine plant.

A condensate pipe 65 connecting the condenser 25 with a deaerator 34 is installed in the condensate water system of the conventional thermal power plant. The condensate water in the conventional thermal power plant is heated by the LP heater 32, deaerated by the deaerator 34, and then turned to feedwater. Besides, a feedwater pipe 66 connecting the deaerator 34 with the boiler 10 is installed in the feedwater system of the conventional thermal power plant. The feedwater in the conventional thermal power plant is pressurized by the feedwater pump 36, heated by the HP heater 37, and then returned to the boiler 10.

On the other hand, the feedwater in the gas turbine plant is led through a feedwater pipe 72 into the heat recovery steam generator 50, which recovers heat from the exhaust of the gas turbine 40, and turned to steam by heat exchange with the gas turbine exhaust, and then joined into the main steam pipe 60 through the HP pipe 70 connecting the HP drum 51 with the main steam pipe 60, and serves as superheated steam to drive the HP turbine 21.

Besides, the feedwater, having branched inside the heat recovery steam generator 50 and directed to the LP drum 52, is turned to steam by heat exchange with the gas turbine exhaust, and then joined into the hot reheat pipe 62 through the LP pipe 71 connecting the LP drum 52 with the hot reheat pipe 62, and serves as superheated steam to drive the IP turbine 22.

In normal operation, power generation cycle is repeated as above and the electric energy is generated by the steam turbine generator 24, which is driven by the directly-connected HP, IP and LP steam turbines 21, 22 and 23, and also by the gas turbine generator 44, which is driven by the directly-connected gas turbine in this-power plant.

While the plant continues operation in the above cycle under normal condition, the conventional thermal power plant is equipped with a system for dumping the generated steam into the condenser in case of start, stop and load rejection where the generated steam cannot be directed into the steam turbine. In this embodiment, there is provided a turbine bypass system 1 that is branched from the main steam pipe 60 and connected to the condenser 25 through the turbine bypass valve 8 and relevant pipe. With this turbine bypass system 1, the steam generated by the boiler 10 can be dumped into the condenser 25.

On the other hand, there is provided another turbine bypass system for the steam generated by the heat recovery steam generator 50: a HRSG HP turbine bypass system 2 that is branched from the HP pipe 70 and connected to the turbine bypass system 1 and a HRSG LP turbine bypass system 3 that is branched from the LP pipe 71 and connected to the turbine bypass system 1.

That is, in this embodiment, the HRSG high pressure turbine bypass system 2 (HRSG low pressure turbine bypass system 3) which is the second turbine bypass system is connected in the middle of the first turbine bypass system 1. Furthermore, the turbine bypass system 1 from the connecting point of the HRSG high pressure turbine bypass system 2 (HRSG low pressure turbine bypass system 3) to a steam condenser 25 is shared as a bypass system of the generating steam of the combustion boiler 10 and the exhaust heat recovery boiler 50.

When building the parallel power generation system composed of the steam power generation plant, the gas turbine, and the exhaust heat recovery boiler, by sharing a part of turbine bypass system 1 also as a turbine bypass system in the exhaust heat recovery boiler 50 such as this embodiment, enlargement and complication of a steam condenser 25 is avoided, and it is able to reduce the cost of a steam condenser or a turbine bypass system considerably.

Moreover, when carrying out the re-powering by adding the gas turbine plant to an established steam power generation plant, large reconstruction of a steam condenser may be needed and it may not be able to do in reconstruction depending on the case. However, it becomes possible to solve these problems by constituting a turbine bypass system as mentioned above.

To start this power plant, the conventional thermal power plant is started first, and then the gas turbine plant is started. Accordingly, the boiler 10 is started first and the steam generated by the boiler 10 is discharged into the condenser 25 through the turbine bypass system 1 in the beginning, and then, when the pressure and temperature of the steam generated by the boiler 10 become high enough to be supplied to the steam turbine, the steam is led into the steam turbine.

Then, when the turbine bypass system 1 becomes not in operation or the amount of steam from the boiler 10 into the turbine bypass system 1 becomes lower than a specified amount after the steam generated by the boiler 10 is all directed into the steam turbine, the gas turbine plant is started. The steam generated by the heat recovery steam generator 50 is directed, through the HRSG HP turbine bypass system 2 and HRSG LP turbine bypass system 2, into the turbine bypass system 1 and then discharged into the condenser 25.

When the pressure and temperature of the high-pressure steam from the heat recovery steam generator 50 become high enough to be mixed into the main steam, and when the pressure and temperature of the low-pressure steam from the heat recovery steam generator 50 become high enough to be mixed into the hot reheat steam, each steam from the heat recovery steam generator 50 is mixed into the main steam pipe 60 and hot reheat pipe 62, respectively, and the turbine bypass system 1 becomes not in operation.

As the turbine bypass system 1 of the boiler 10 is put into service for the boiler 10 and heat recovery steam generator 50 in turn as explained above, the turbine bypass systems 2 and 3 from the heat recovery steam generator can be connected each to the turbine bypass system 1 of the boiler 10.

The above operation is maintained so far as the control unit 80 monitors the opening state of the turbine bypass valve 8 and permits to start the gas turbine 40 only when the above operating condition is met.

In an event of load rejection or steam turbine tripping, generated steam can no longer be directed into the steam turbine either in the conventional thermal power plant or in the gas turbine plant, and so the generated steam cannot be handled only by the turbine bypass system 1. Because of the above, it is recommended that each boiler pipe and HRSG pipe is equipped with a release valve 64 for releasing the steam generated in the conventional thermal power plant and gas turbine plant into the air.

With the combined cycle plant according to this embodiment, because it is not necessary to install a system for dumping the generated steam into the condenser in each conventional thermal power plant and gas turbine plant, the generated steam can be dumped into the condenser without increasing the number of inlet ports on the condenser of an existing plant.

Besides, because the operating state of the gas turbine plant and conventional thermal power plant is monitored and each plant is started in turn accordingly, it no longer happens that the steam generated in the gas turbine plant and in the conventional thermal power plant is dumped into the condenser at the same time. Thus, the capacity of the dump system can decrease.

A typical embodiment of the present invention is as explained above. However, since there are different constructions available for the system for dumping the generated steam into the condenser, some more are described hereunder.

Embodiment 2

Figure 2:
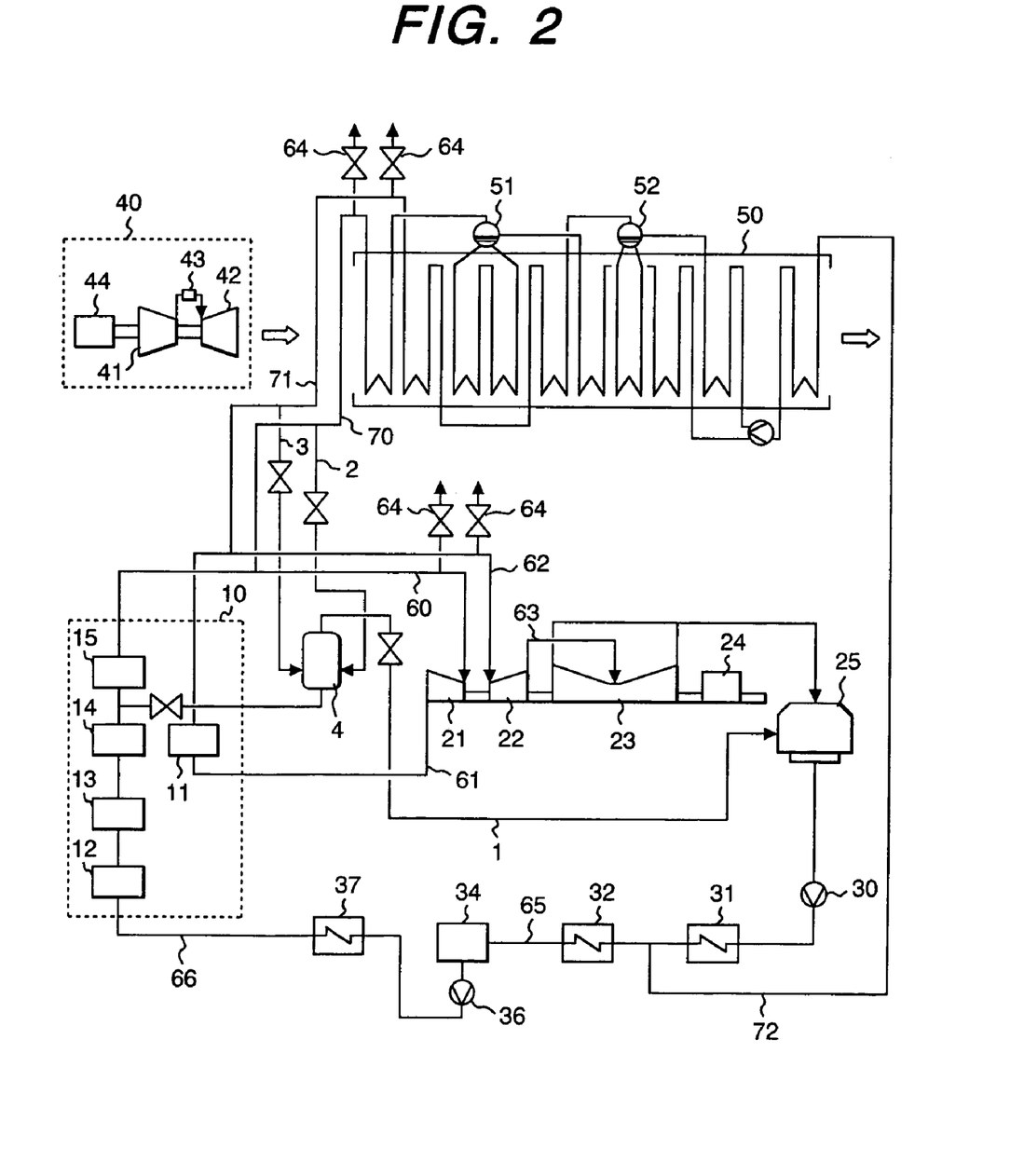
FIG. 2 is a schematic diagram of the combined cycle plant according to the embodiment 2 of the invention.

FIG. 2 shows a preferred embodiment 2 of a combined cycle plant according to the present invention. The same devices and components as in FIG. 1 are denoted the same and no more explanation is given on them. Description hereunder covers differences only. In the figure, the control unit 80 is not shown.

The plant is equipped with the turbine bypass system 1 as a system for dumping the generated steam into the condenser. The turbine bypass system of this embodiment is branched from the main steam pipe 60 at the outlet of the primary superheater 14, directed through the pipe and the flash tank 4, and then piped and connected to the condenser 25. With this turbine bypass system 1, the steam generated at the start of the boiler 10 is dumped into the condenser 25.

The plant is also equipped with another turbine bypass system for dumping the steam generated by the heat recovery steam generator 50: the HRSG HP turbine bypass system 2 that is branched from the HP pipe 70 and connected to the flash tank 4, and the HRSG LP turbine bypass system 3 that is branched form the LP pipe 71 and connected to the flash tank 4. The point of connection of each turbine bypass system from the heat recovery steam generator 50 can be located not only on the flash tank 4 but also on the pipe near the flash tank 4.

Embodiment 3

Figure 3:
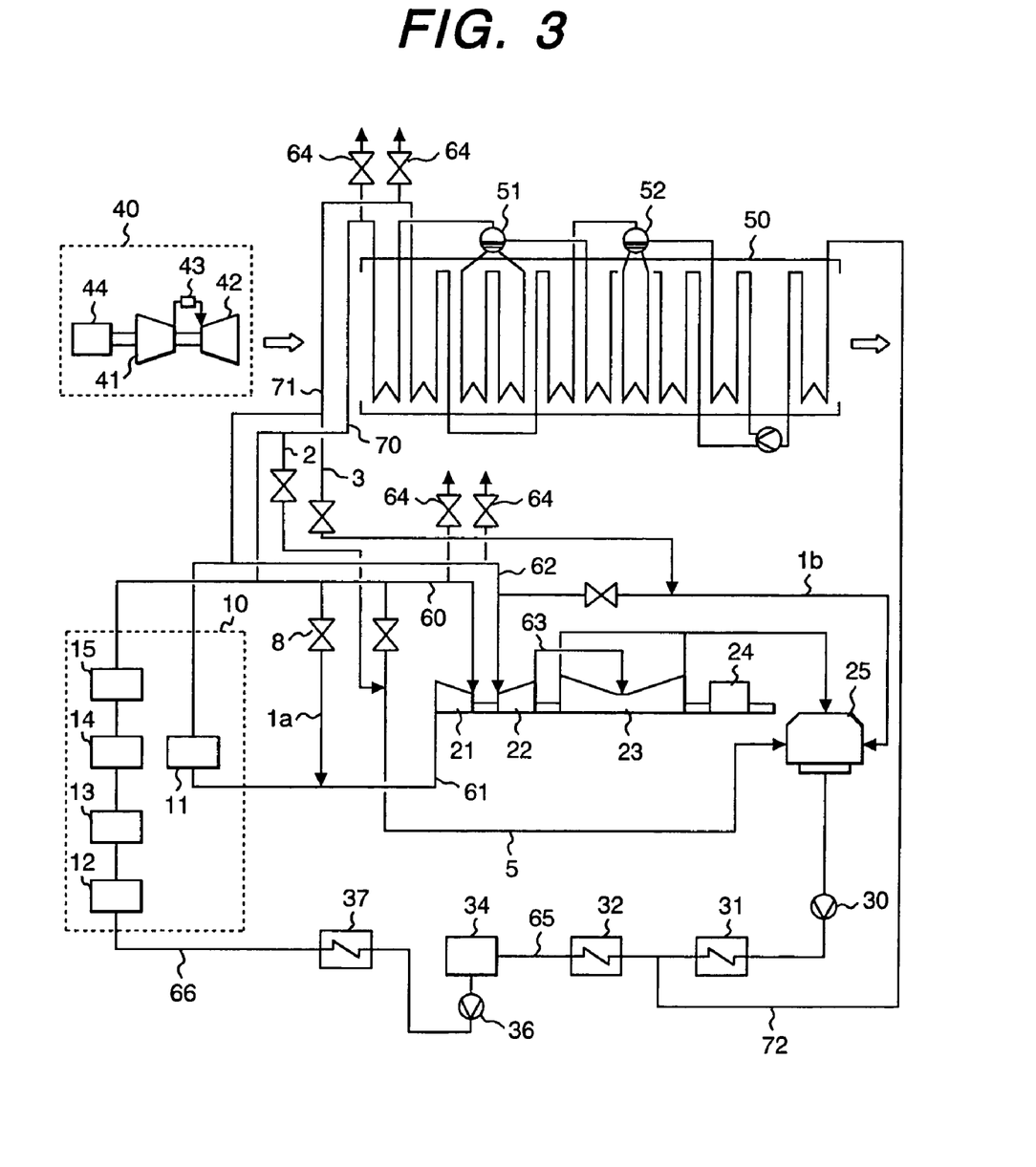
FIG. 3 is a schematic diagram of the combined cycle plant according to the embodiment 3 of the invention.

FIG. 3 shows a preferred embodiment 3 of a combined cycle plant according to the present invention. The same devices and components as in FIG. 1 and FIG. 2 are denoted the same and no more explanation is given on them. Description hereunder covers differences only. In the figure, the control unit 80 is not shown.

As the turbine bypass system for the boiler 10, the plant is equipped with the HP turbine bypass system 1a that is branched from the main steam pipe 60 and connected to the cold reheat pipe 61 and the LP turbine bypass system 1b that is branched from the hot reheat pipe 62 and connected to the condenser 25. Besides, a main steam pipe drain system 5 connecting the main steam pipe 60 with the condenser 25 is also installed. The main steam pipe drain system 5 and LP turbine bypass system 1b serve as a system for dumping the generated steam into the condenser.

The HRSG HP turbine bypass system 2 is connected to the main steam pipe drain system 5 and the HRSG LP turbine bypass system 3 is connected to the LP turbine bypass system 1b so as to serve as the turbine bypass system for the steam generated by the heat recovery steam generator.

Embodiment 4

Figure 4:
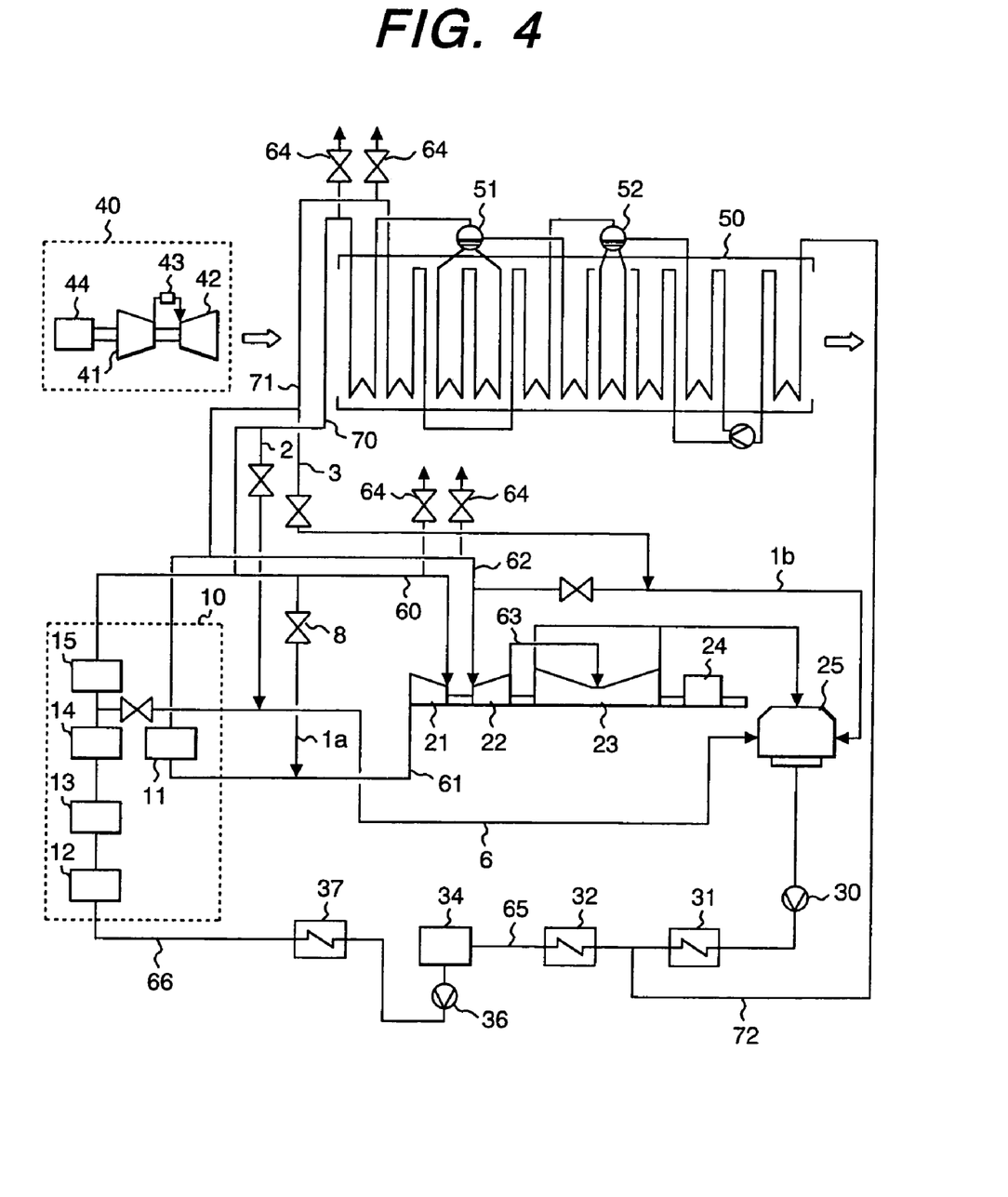
FIG. 4 is a schematic diagram of the combined cycle plant according to the embodiment 4 of the invention.

FIG. 4 shows a preferred embodiment 4 of a combined cycle plant according to the present invention. The same devices and components as in FIGS. 1 to 3 are denoted the same and no more explanation is given on them. Description hereunder covers differences only. In the Figure, the control unit 80 is not shown.

The plant of this embodiment is equipped with the secondary superheater bypass system 6 connecting the main steam pipe 60 with the condenser 25. The secondary superheater bypass system 6 and LP turbine bypass system 1b are installed to serve as the system for dumping the generated steam into the condenser.

The HRSG HP turbine bypass system 2, branched from the HP pipe 70 and connected to the secondary superheater bypass system 6, and HRSG LP turbine bypass system 3, branched from the LP pipe 71 and connected to the LP turbine bypass system 1b, are installed to serve as the turbine bypass system for the steam generated by the heat recovery steam generator 50.

Embodiment 5

Figure 5:
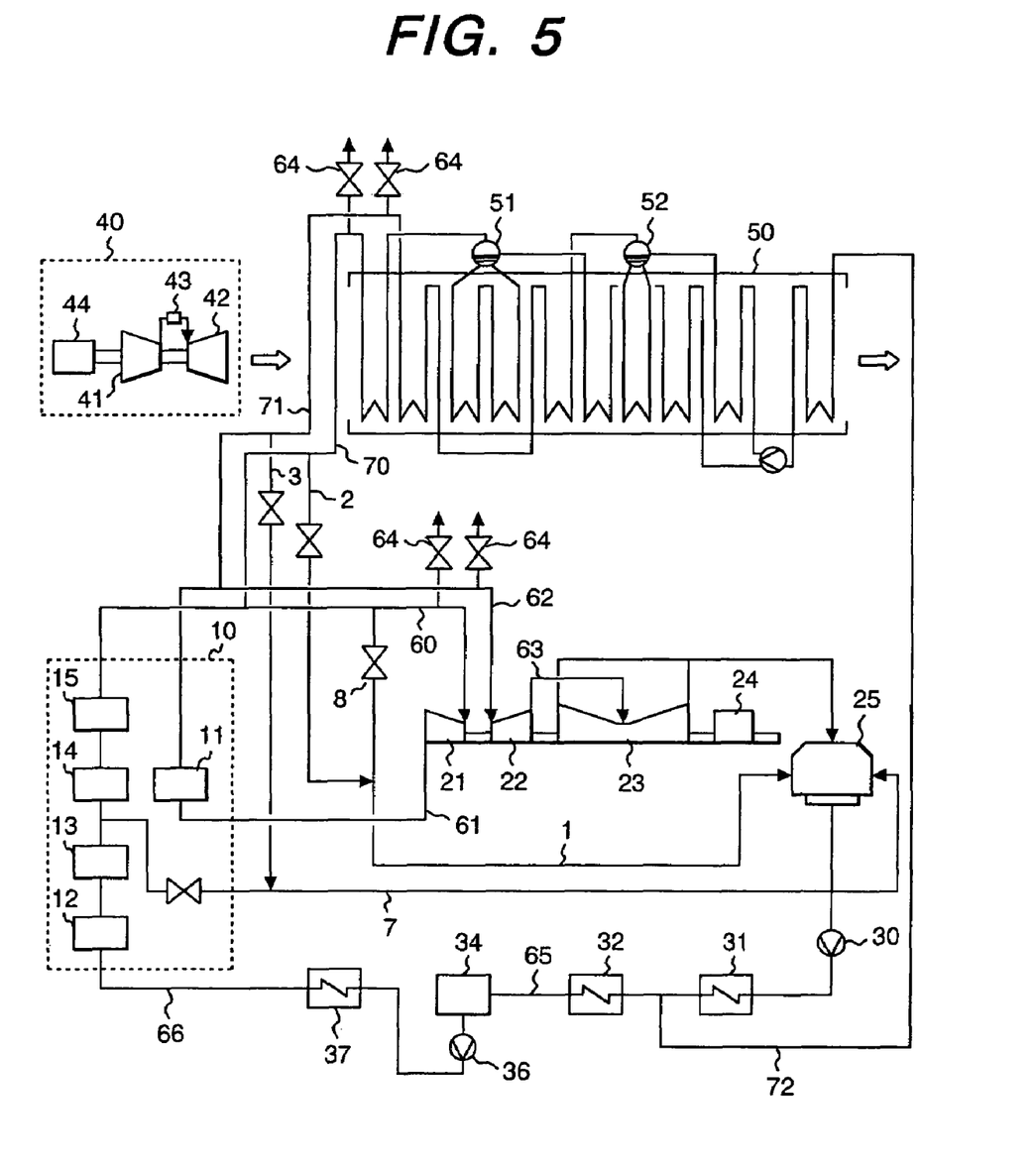
FIG. 5 is a schematic diagram of the combined cycle plant according to the embodiment 5 of the invention.

FIG. 5 shows a preferred embodiment 5 of a combined cycle plant according to the present invention. The same devices and components as in FIGS. 1 to 4 are denoted the same and no more explanation is given on them. Description hereunder covers differences only. In the Figure, the control unit 80 is not shown.

The plant of this embodiment is equipped with the superheater inlet dump system 7 connecting the main steam pipe 60 with the condenser 25. The superheater inlet dump system 7 and turbine bypass system 1 serve as the system for dumping the generated steam into the condenser.

The HRSG HP turbine bypass system 2, branched from the HP pipe 70 and connected to the turbine bypass system 1, and HRSG LP turbine bypass system 3, branched from the LP pipe 71 and connected to the superheater inlet dump system 7, are installed to serve as the turbine bypass system for the steam generated by the heat recovery steam generator 50.

Embodiment 6

Figure 6:
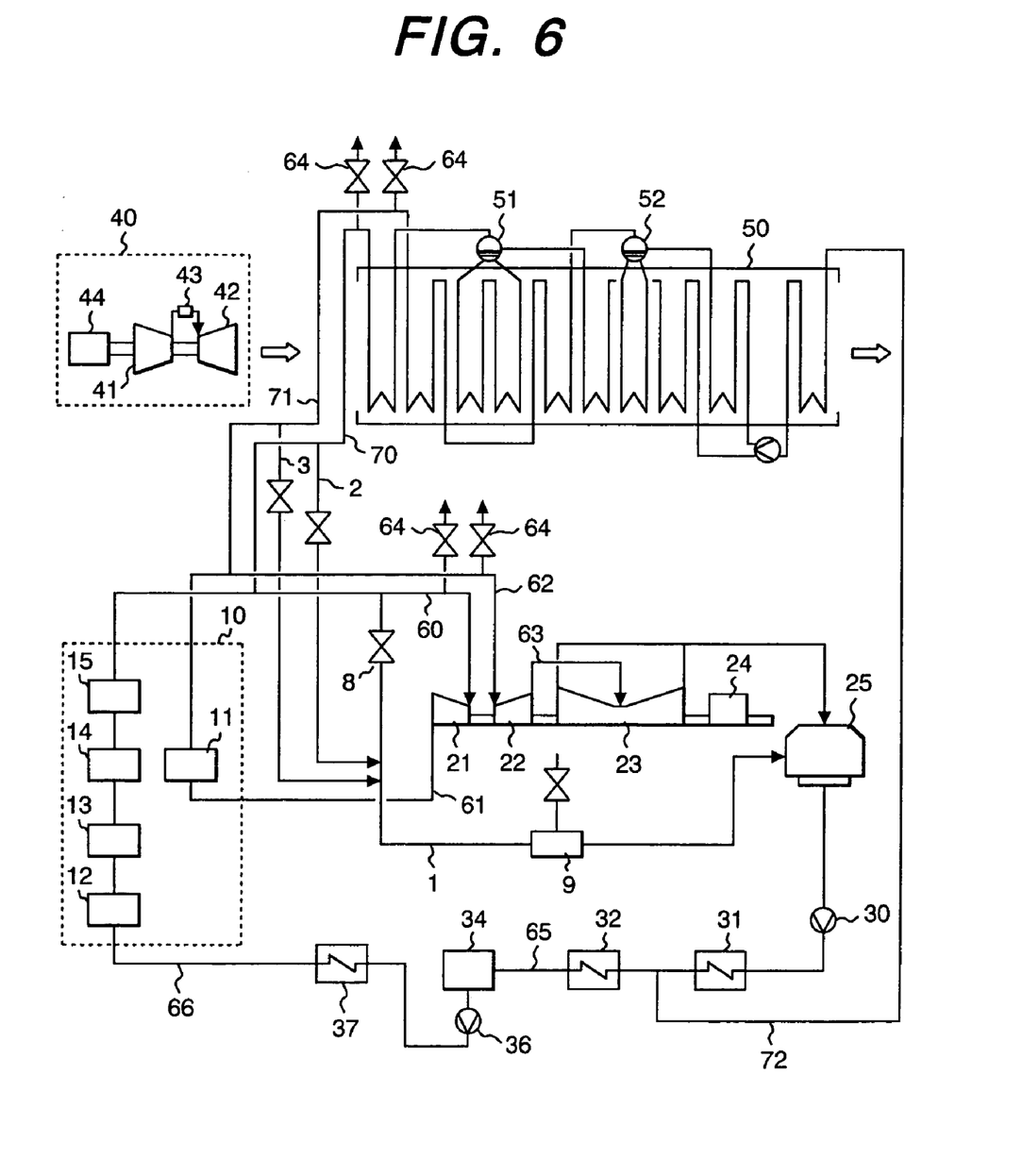
FIG. 6 is a schematic diagram of the combined cycle plant according to the embodiment 6 of the invention.

FIG. 6 shows a preferred embodiment 6 of a combined cycle plant according to the present invention. The same devices and components as in FIGS. 1 to 5 are denoted the same and no more explanation is given on them. Description hereunder covers differences only. In the figure, the control unit 80 is not shown.

In the plant of this embodiment, an attemperator 9 is installed on the turbine bypass system 1, and both HRSG HP turbine bypass system 2 and HRSG LP turbine bypass system 3 are connected to the turbine bypass system 1. The point of connection is located on a pipe from the turbine bypass valve 8 to the attemperator 9.

Assuming that a combined cycle plant is to be constructed, there may be several different cases available in addition to a case where a new combined cycle plant is constructed from the scratch as above: for example, a case where a gas turbine plant is newly added to the existing conventional thermal power plant or a case where boiler and gas turbine plant are newly installed but the existing steam turbine is put into use.

When a new power plant according to the present invention is to be constructed, installing respective dump systems for dumping the steam generated in the conventional thermal power plant and gas turbine plant into the condenser is not necessary. Even in the case where a gas turbine plant is to be added to an existing conventional thermal power plant, no additional inlet port needs to be installed on the condenser to receive a dump system for the steam generated by the heat recovery steam generator, and so large-scale remodeling of the condenser is not needed.

The meaning of Reference signs in Figs. are as follows:
1 . . . Turbine bypass system, 2 . . . High pressure turbine bypass system of HRSG, 3 . . . Low pressure turbine bypass system of HRSG, 4 . . . Flash tank, 5 . . . Drain system of main steam pipe, 6 . . . Bypass system of secondary superheater, 7 . . . Dump system at superheater inlet, 8 . . . Turbine bypass valve, 9 . . . Attemperator, 10 . . . Boiler, 11 . . . Reheater, 12 . . . Economizer, 13 . . . Evaporator, 14 . . . Primary superheater, 15 . . . secondary superheater, 21 . . . HP (high-pressure) turbine, 22 . . . IP (intermediate-pressure) turbine, 23 . . . LP (low-pressure) turbine, 24 . . . Steam turbine generator, 25 . . . Condenser, 30 . . . Condensate pump, 31 . . . Gland steam condenser, 32 . . . LP (low-pressure) heater, 34 . . . Deaerator, 36 Feedwater pump, 37 . . . HP (high-pressure) heater, 40 . . . Gas turbine, 41 . . . Compressor, 42 . . . Turbine, 43 . . . Combustor, 44 . . . Gas turbine generator, 50 . . . Heat recovery steam generator, 51 . . . HP drum, 52 . . . LP drum, 60 . . . Main steam pipe, 61 . . . Cold reheat pipe, 62 . . . Hot reheat pipe, 63 . . . Crossover pipe, 64 . . . Release valve, 70 . . . HP pipe, 71 . . . LP pipe, 72 . . . Feedwater pipe, 80 . . . Control unit.

According to the present invention, because installing respective dump systems for dumping the steam generated in the conventional thermal power plant and gas turbine plant into the condenser is not necessary, a system for dumping the generated steam into the condenser can be constructed without increasing the number of inlet ports on the condenser of an existing plant.

What is claimed is:

1. A combined cycle plant equipped with a conventional thermal power plant having a boiler, boiler pipe including main steam pipe, cold reheat pipe and hot reheat pipe, steam turbine; condenser; and condensate water/feedwater system, and
  a gas turbine plant having a gas turbine, heat recovery steam generator recovering heat from the gas turbine exhaust. and heat recovery steam generator pipe supplying the generated steam from the heat recovery steam generator to the steam turbine, the combined cycle plant further comprising:
  a dump system connecting the boiler pipe with the condenser and dumps the steam generated by the boiler into the condenser, bypassing the steam turbine; and
  a pipe connecting the heat recovery steam generator pipe with the dump system into the condenser
  wherein the dump system into the condenser is the main steam pipe drain system of the conventional thermal power plant and the point of connection between the heat recovery steam generator and the dump system into the condenser is located on a pipe of the main steam pipe drain system.

2. A combined cycle plant equipped with a conventional thermal power plant having a boiler, boiler pipe including main steam pipe, cold reheat pipe and hot reheat pipe, steam turbine; condenser; and condensate water/feedwater system, and
  a gas turbine plant having a gas turbine, heat recovery steam generator recovering heat from the gas turbine exhaust, and heat recovery steam generator pipe supplying the generated steam from the heat recovery steam generator to the steam turbine, the combined cycle plant further comprising:
  a dump system connecting the boiler pipe with the condenser and dumps the steam generated by the boiler into the condenser, bypassing the steam turbine; and
  a pipe connecting the heat recovery steam generator pipe with the dump system into the condenser
  wherein the dump system into the condenser is a superheater bypass system of the conventional thermal power plant and the point of connection between the heat recovery steam generator and the dump system into the condenser is located on a pipe of the superheater bypass system.

3. A combined cycle plant according to claim 2, further comprising a valve installed in the dump system into the condenser and a control unit that employs state variables of the valve as input and controls the start timing of the gas turbine plant.

4. A method of starting a combined cycle plant, equipped with:
  a conventional thermal power plant comprising: boiler; boiler pipe including main steam pipe, cold reheat pipe and hot reheat pipe; steam turbine; condenser; and condensate water/feedwater system;
  a gas turbine plant comprising: gas turbine; heat recovery steam generator that recovers heat from the gas turbine exhaust; and heat recovery steam generator pipe that supplies the generated steam from the heat recovery steam generator to the steam turbine;
  a dump system that connects the boiler pipe to the condenser and dumps the steam generated by the boiler into the condenser, bypassing the steam turbine; and
  a pipe that connects the heat recovery steam generator pipe with the dump system into the condenser; wherein
  the boiler is started and the start-up state of the boiler is checked, using the state variables of a valve, installed in the dump system into the condenser, as input, to see whether the boiler is in a state where the dump system into the condenser is not in operation or whether the amount of steam dumped from the boiler into the condenser is lower than a specified amount, and the gas turbine plant is started when the above condition is met.

5. A control unit for a combined cycle plant comprising a conventional thermal power plant having a boiler, boiler pipe including main steam pipe, cold reheat pipe and hot reheat pipe, steam turbine, condenser, and condensate water/feedwater system;
  a gas turbine plant having a gas turbine, heat recovery steam generator that recovers heat from the gas turbine exhaust, and heat recovery steam generator pipe that supplies the generated steam from the heat recovery steam generator to the steam turbine,
  a dump system that connects the boiler pipe to the condenser and dumps the steam generated by the boiler into the condenser, bypassing the steam turbine,
  a pipe that connects the heat recovery steam generator pipe with the dump system into the condenser; and
  a control unit for controlling the plant so that whether the boiler is in a state where the dump system into the condenser is not in operation or whether the amount of steam dumped from the boiler into the condenser is lower than a specified amount is judged, using the state variables of a valve, installed in the dump system into the condenser, as input, and that the gas turbine plant is started when the above condition is met.

6. A gas turbine plant installed additionally to an existing conventional thermal power plant comprising: boiler, boiler pipe including main steam pipe, cold reheat pipe and heat reheat pipe steam turbine, condenser, and condensate water/feedwater system; the gas turbine plant comprising: gas turbine; heat recovery steam generator that recovers heat from the gas turbine exhaust; and heat recovery steam generator pipe that supplies the generated steam from the heat recovery steam generator to the steam turbine;
  equipped with a pipe connecting the heat recovery steam generator pipe with
  a dump system that connects the boiler pipe with the condenser and dumps the steam generated by the boiler into the condenser, bypassing the steam turbine;
  a valve installed in the dump system into the condenser of the conventional thermal power plant, and
  a control unit for controlling the plant so that whether the boiler is in a state where the dump system into the condenser is not in operation or whether the amount of steam dumped from the boiler into the condenser is lower than a specified amount is judged, using the state variables of the valve as input, and that the gas turbine plant is started when the above condition is met.

* * * * *